(12) United States Patent
Park et al.

(10) Patent No.: US 10,590,544 B2
(45) Date of Patent: Mar. 17, 2020

(54) PICKLING AND PASSIVE FILM TREATING AGENT FOR REMOVING SCALES AND RUSTS ON WELDING PARTS OF STAINLESS STEEL PIPES AND STRUCTURES

(71) Applicants: Sung-Sik Park, Seoul (KR); Sang-Jin Kim, Busan (KR)

(72) Inventors: Sung-Sik Park, Seoul (KR); Sang-Jin Kim, Busan (KR)

(73) Assignee: CHUNWOO TECH., LTD, Busan (KR)

( * ) Notice: Subject to any disclaimer, the term of this patent is extended or adjusted under 35 U.S.C. 154(b) by 232 days.

(21) Appl. No.: 15/875,309

(22) Filed: Jan. 19, 2018

(65) Prior Publication Data

US 2018/0142360 A1     May 24, 2018

Related U.S. Application Data

(63) Continuation of application No. PCT/KR2017/012787, filed on Nov. 13, 2017, and a continuation of application No. PCT/KR2017/005708, filed on May 31, 2017.

(30) Foreign Application Priority Data

Jun. 1, 2016   (KR) .................. 10-2016-0067898

(51) Int. Cl.
| | |
|---|---|
| *C23C 22/07* | (2006.01) |
| *C23G 1/08* | (2006.01) |
| *C23G 1/24* | (2006.01) |
| *C23C 22/78* | (2006.01) |
| *C23C 22/68* | (2006.01) |
| *C02F 5/08* | (2006.01) |
| *C23G 1/26* | (2006.01) |

(52) U.S. Cl.
CPC .................. *C23G 1/08* (2013.01); *C02F 5/08* (2013.01); *C23C 22/68* (2013.01); *C23C 22/78* (2013.01); *C23G 1/24* (2013.01); *C23G 1/26* (2013.01)

(58) Field of Classification Search
CPC ....................................................... C23C 22/07
USPC ......................................... 148/250; 510/247
See application file for complete search history.

(56) References Cited

U.S. PATENT DOCUMENTS

| | | | | |
|---|---|---|---|---|
| 3,961,991 | A * | 6/1976 | Yoshida .................. | C23C 22/08 148/254 |
| 4,680,064 | A * | 7/1987 | Portz ....................... | C23C 22/08 148/260 |
| 2013/0313125 | A1* | 11/2013 | Kamachi .................. | C25D 5/34 205/211 |

FOREIGN PATENT DOCUMENTS

| | | |
|---|---|---|
| CN | 103103549 A | 5/2013 |
| JP | 2007-181797 A | 7/2007 |
| KR | 1999-016917 A | 3/1999 |

(Continued)

*Primary Examiner* — Gregory E Webb
(74) *Attorney, Agent, or Firm* — Jefferson IP Law, LLP

(57) ABSTRACT

A composition for pickling a welded portion and a rust-generated portion according to installation of pipes, structures, plants, and so on formed of stainless steel, and for forming a passive state film thereon is provided. More particularly, the present disclosure relates to a neutral agent for passivating a surface of stainless steel metal in which a neutral agent is obtained by neutralizing a basic aqueous solution to 6.9 pH to 7.1 pH and aerated with carbon dioxide-free air to increase the amount of dissolved oxygen, so that an oxidation reduction potential in a range of 170 mV to 310 mV is obtained.

2 Claims, 14 Drawing Sheets

(56) References Cited

FOREIGN PATENT DOCUMENTS

KR  10-2006-0107966 A  10/2006
KR  10-1355863 B1  1/2014

* cited by examiner

Graph showing an analysis for components on a surface of stainless steel processed according to comparative example 2

Sputtering rate(for $Ta_2O_5$)
0minute~15minute : 2.0nm/minute
15minute~30minute : 6.1nm/minute
30minute~50minute : 18.5nm/minute

PICKLING AND PASSIVE FILM TREATING AGENT FOR REMOVING SCALES AND RUSTS ON WELDING PARTS OF STAINLESS STEEL PIPES AND STRUCTURES

CROSS-REFERENCE TO RELATED APPLICATION(S)

This application is a continuation application, claiming the benefit under § 365(c), of an International application filed on May 31, 2017 and assigned application number PCT/KR2017/005708, which claimed the benefit of a Korean patent application filed on Jun. 1, 2016 in the Korean Intellectual Property Office and assigned Serial number 10-2016-0067898, and of an International application filed on Nov. 13, 2017 and assigned application number PCT/KR2017/012787, which claimed the benefit of a Korean patent application filed on Jun. 1, 2016 in the Korean Intellectual Property Office and assigned Serial number 10-2016-0067898, the entire disclosure of each of which is hereby incorporated by reference.

TECHNICAL FIELD

The present disclosure relates to stainless steel on which rusts and corrosions rarely generate under environmental conditions such as oxygen atmosphere, moisture and aqueous solution in the air compared to ordinary steel. More particularly, the present disclosure relates to a composition for pickling a welded part and a rust-generated part according to installation of pipes, structures, plants and so on which are formed of stainless steel, and for forming a passive film thereon.

BACKGROUND

STS 304 and STS 316L are the most commonly used stainless steel for shipyards and offshore plants of which a surface layer is contaminated or deformed due to scratch by external exposure and oxidation by welding, thereby causing rusts and corrosions.

Normal stainless steel includes Fe as a basic component, Cr and Ni as main components, and Mo, Ti, Mn, Zr, Nb, N or the like in a small amount.

Currently, the stainless steel is shipped to plates, coils, steel pipes and other products through schemes such as cold rolling, welding, heat treatment, pickling and passive film treatment.

In addition, FeO, $Fe_3O_4$, $Fe_2O_3$, NiiO, $Ni_3O_4$, $Ni_2O_3$, $CrO_3$ and $Cr_2O_3$ are mainly formed on the oxidized surface.

Accordingly, when the oxidized surface has many $Cr_2O_3$ and $NI_2O_3$, acid resistance, corrosion resistance and oxidation resistance become strong, so that rusts are not easily generated.

In addition, regarding iron oxide, the acid resistance, corrosion resistance and oxidation resistance are strong in an order of $Fe_2O_3$, $Fe_3O_4$, and FeO.

In addition, in the case of conventional pickling and passivating agents, most are processed with an acid atmosphere or an acid solution and hazardous chemical substances are contained therein.

As for some neutral solutions, acid and basic chemical substances used as raw materials are also classified as hazardous chemical substances, therefore the hazardous chemical substances should be indicated in substance information for products formed of those substances.

Currently, when the hazardous chemical substances are used, chemical safety protective equipment should be worn during work, and preventive facilities should be provided based on Chemical Control Act and Occupational Safety and Health Act.

Particularly in the shipbuilding and plant industries, a zone for pickling and passivating work should be controlled and the work should be prohibited from being performed in parallel with another work.

In addition, when ships and offshore plants are constructed, because stainless steel pipes and structures are installed on the ship or in the field, and the installed pipes and structures are contaminated or corroded by welding, the pickling and passive film treatment is required.

In general, the treatment is processed using a strong acid solution obtained by mixing nitric acid, sulfuric acid, hydrochloric acid and hydrofluoric acid as pickling and passivating agents. At this time, when the acid solution agent flows down to a floor surface or when a washing solution flows down to the floor during washing work, the acid solution agent generally is reacted with coated epoxy resin, thereby causing discoloration or deformation, thus sometimes the floor is required to be coated again.

In addition, because of the strong acid agent, the agents need to be neutralized with a basic agent and finally washed with clear water, and because of using hazardous chemical substances, a workplace should be controlled, another work cannot be performed concurrently, and chemical safety protection equipment and preventive substances should also be provided.

An object of the present disclosure is to shorten a process in which the neutral agent of 6.9 pH to 7.1 pH is used as a pickling and passivating agent, so that water washing is implemented without neutralization using a basic agent during the process.

In addition, the neutral agent which does not react with the resin prevents a coating portion from being discolored and deformed, so that convenience in use is improved.

In addition, since raw materials of the product have no hazardous chemical substances, the raw materials are not regulated by Chemical Control Act, Safety Control of Dangerous Substances Act, and Occupational Safety and Health Act, so that it is convenient for works.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a pickling and passive film agent for removing scales and rusts on welding parts of stainless steel pipes and structures, in which pickling and passive film agent is prepared by: neutralizing the basic aqueous solution having 2 to 10 parts by weight of disodium hydrogen phosphate, 1 to 5 parts by weight of sodium gluconate, and 0.5 to 3 parts by weight of sodium tripolyphosphate and the like into a range of 6.9 pH to 7.1 pH by reacting the basic aqueous solution with 1.1 to 4.5 parts by weight of monobasic sodium phosphate; and aerating the neutralized solution with carbon dioxide-free air to increase an amount of dissolved oxygen, so that an oxidation reduction potential in a range of 170 mV to 310 mV is obtained.

In accordance with an aspect of the present disclosure, a composition as a neutral agent is used upon pickling and passivating treatment for removing scales and rusts on welding part of stainless steel pipes and structures, so that problems caused by using hazardous chemical substances can be solved, and another work can be performed concurrently. In addition, due to the neutral agent, discoloration and deformation can be prevented even though it falls on the floor coated with epoxy resin.

In addition, compared to the inconvenient of works at various stages such as applying acid solution, water washing, applying a basic solution, and then water washing during the conventional process, the process according to the present disclosure can be simplified and the working time can be shortened only by water washing after applying the neutral agent.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
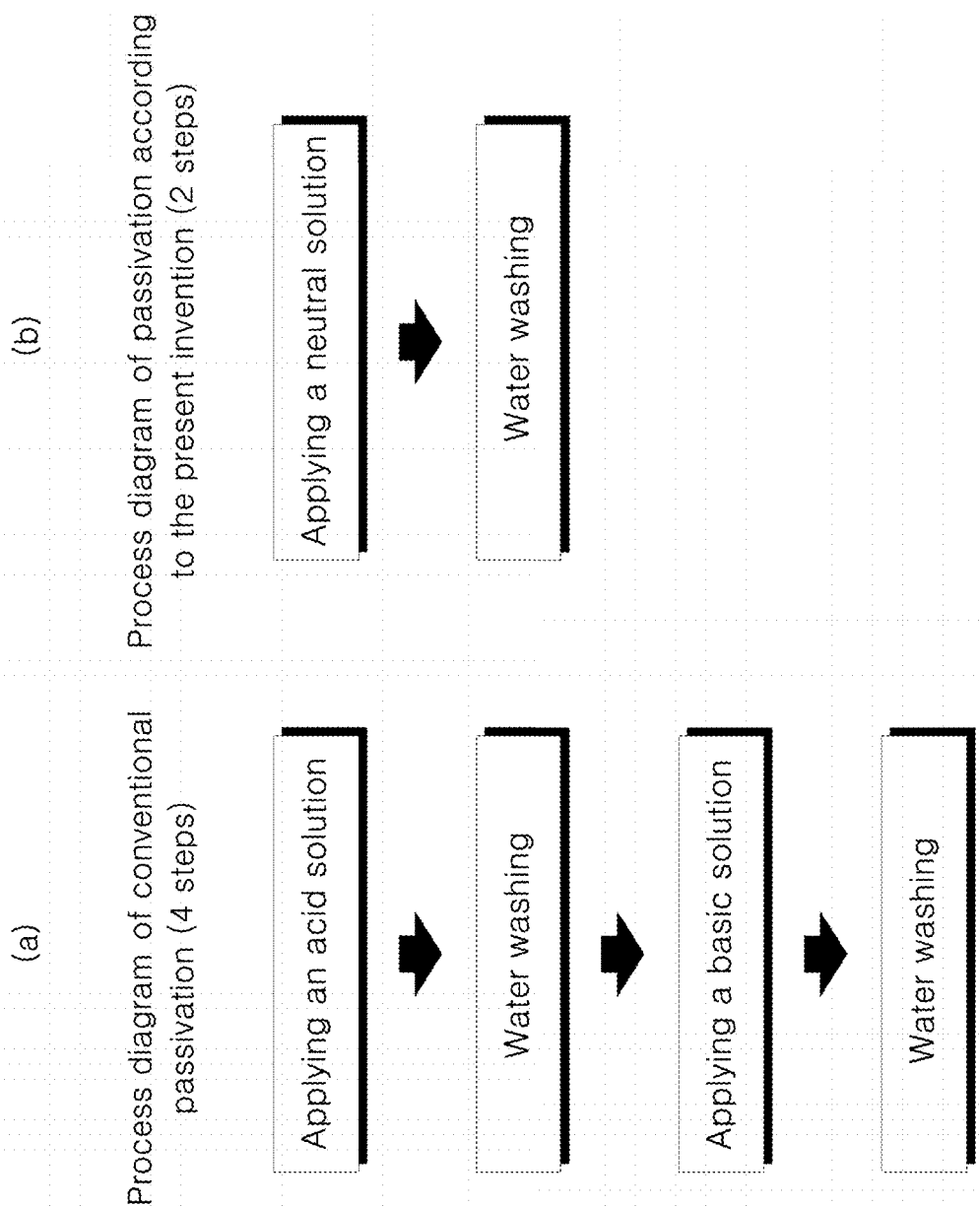
FIG. 1 shows process diagrams of a conventional passivation and a passivation with respect to a surface of stainless steel according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The best mode for carrying out the present disclosure is a pickling and passive film treating agent for removing scales and rusts on welding parts of stainless steel pipes and structures in which 2 to 10 parts by weight of disodium hydrogen phosphate, 1 to 5 parts by weight of sodium gluconate, and 0.5 to 3 parts by weight of sodium tripolyphosphate are contained in water so as to obtain a basic aqueous solution, the basic aqueous solution is reacted with 1.1 to 4.5 parts by weight of monobasic sodium phosphate so as to be neutralized into 6.9 pH to 7.1 pH, and the neutralized agent is aerated with carbon dioxide-free air so as to increase the amount of dissolved oxygen, so that an oxidation reduction potential becomes 170 mV to 310 mV.

According to the present disclosure, a neutral agent is used so that the work process is simplified compared to the conventional acid agent and it is environmentally friendly without using hazardous chemical substances.

Particularly, when the neutral agent is applied to a corroded part, phosphate, gluconate and so on are reacted with iron oxide, iron hydroxide and so on generated by corrosion, thereby removing rusts from the surface, and chromium, nickel, iron and so on are reacted with dissolved oxygen, thereby forming an oxide layer on the surface, thus a passive film is formed thereon.

Example 1

A basic aqueous solution having 10 parts by weight of disodium hydrogen phosphate ($Na_2HPO_4$), 3 parts by weight of sodium gluconate (C6H11NaO7), 1 part by weight of sodium tripolyphosphate (Na5P3O10), and 81.9 parts by weight of water was reacted with 4.1 parts by weight of monobasic sodium phosphate (NaH2PO4) to prepare a neutral agent.

The neutral agent prepared in the above manner had pH of 7.1, and an oxidation reduction potential was −210 mV based on measurement by an oxidation reduction potential (ORP) meter. The neutral agent prepared as described above was applied to a portion coated with epoxy, and no discoloration or deformation was observed after one week.

The above properties are shown in Table 1 and Table 2.

Figure 2:
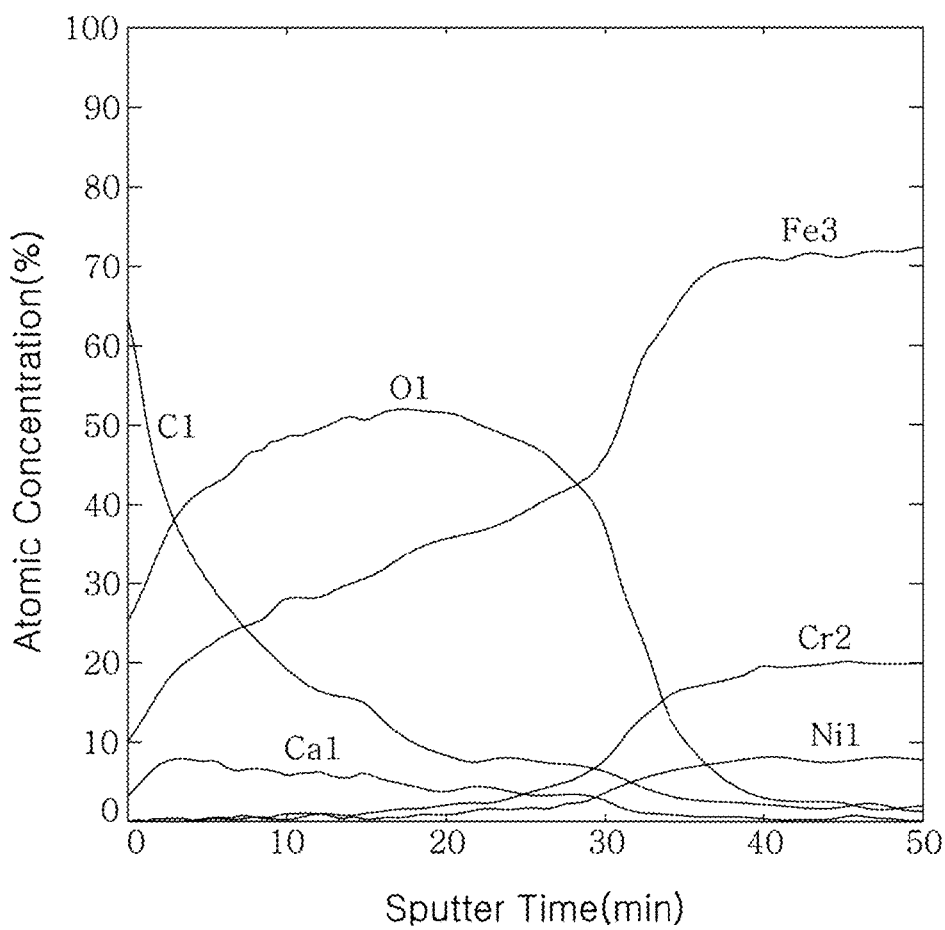
FIG. 2 is a graph showing an analysis for components on a surface of corroded stainless steel according to an embodiment of the present disclosure.

The results of a scanning auger electron microscope (SAM) analysis are shown in FIG. 2 in which a corroded part caused by welding on a ship pipe (STS304, austenitic stainless steel) was partially sampled as a specimen for estimating degrees of the pickling and the passive film of the neutral agent prepared as described above.

As shown in FIG. 2, only C (60%), Fe (10%), Ca (4%) and O (26%) were present on the surface, and Cr and Ni were indicated at an inner side of 28 nm from the surface.

In other words, the pipe is formed therein with a corrosion layer of 28 nm.

After the neutral agent prepared as described above was applied to the pipe, and reacted with foreign matter (such as hydroxide, oxide, and oil) on the surface, the state of the clean surface of the pipe after water washing was regarded as a reaction ending time, and as a result, about 140 minutes were required.

Figure 3:
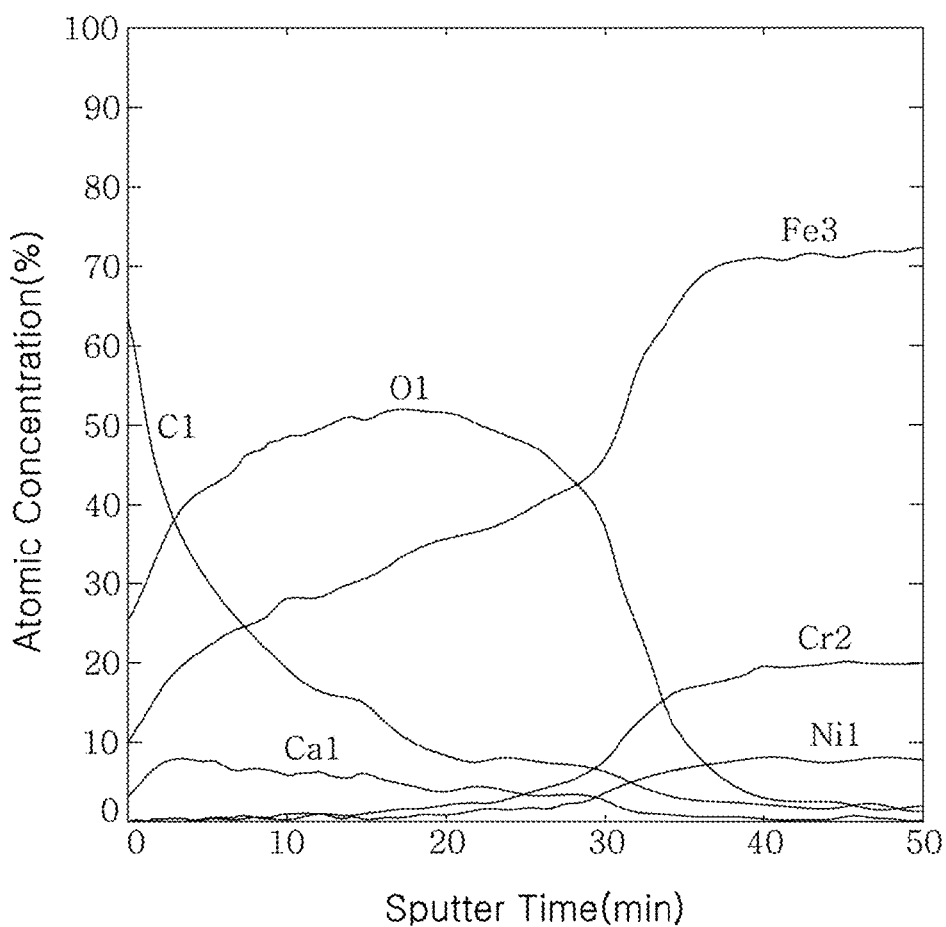
FIG. 3 is a graph showing an analysis for components on a surface of stainless steel processed according to Example 1.

FIG. 3 shows results of SAM analysis after a portion of the washed pipe was sampled.

As shown in FIG. 3, the contents on the surface consist of 53% of C, 6% of Cr, 3% of Ni, 7% of Fe, 6.5% of Ca, and 24.5% of oxygen.

Accordingly, when the content of C is lower the etching by pickling is better, however, it was confirmed that the etching by pickling was small considering that the content of C was 53%, and an oxide layer had a thickness of about 80 nm.

In addition, since a total content of metal is 22.5% and the oxygen content is 24.5%, the ratio of the metal to the oxygen is about 1:1, so a passive film in the form of an oxide containing FeO, CrO, or NiO exists on the surface.

TABLE 1

| Item | Example 1 | Comparative Example 1 | Comparative Example 2 | Example 2 | Example 3 | Example 4 | Example 5 | Example 6 |
|---|---|---|---|---|---|---|---|---|
| Disodium hydrogen phosphate (parts by weight) | 10 | | 10 | 10 | 10 | 10 | 1 | 2 |
| Sodium gluconate | 3 | 5 | | 3 | 3 | 3 | 3 | 3 |
| Sodium tripolyphosphate | 1 | | | 1 | 1 | 1 | 1 | 1 |
| Sodium dihydrogenphosphate | 4.1 | | | 4.1 | 4.1 | 4.1 | 4.1 | 0.7 |
| Phosphoric acid | | 20 | | | | | | |
| Citric acid | | 5 | 10 | | | | | |
| Tartaric acid | | | 5 | | | | | |
| Thio lactic acid | | | 5 | | | | | |
| Potassium hydroxide | | | 20 | | | | | |
| Water | 81.9 | 70 | 60 | 81.9 | 81.9 | 81.9 | 81.9 | 94.3 |
| Air aeration time (hr.) | | | | 0.5 | 2 | 4 | 10 | 10 |
| pH | 7.1 | 1.2 | 7.3 | 7.1 | 7.1 | 7.1 | 7.1 | 6.9 |
| Oxidation reduction potential (mV) | −210 | 120 | −190 | 6 | 90 | 170 | 278 | 293 |
| Pickling reaction time (min.) | 140 | 50 | 110 | 100 | 90 | 70 | 70 | |
| Surface contaminants | none | none | none | none | none | none | none | remaining |
| Chromium (surface; %) | 6 | 5.5 | 0 | 5.5 | 7.5 | 8 | 8.5 | |
| Nickel (surface; %) | 3 | 3 | 1 | 3 | 3.5 | 4 | 4 | |
| Iron (surface; %) | 7 | 10 | 8 | 10 | 12 | 13.5 | 14 | |
| Calcium (surface; %) | 6.5 | 7 | 7 | 5 | 7 | 3.5 | 3.5 | |
| Oxygen (surface; %) | 24.5 | 29.5 | 24 | 26.5 | 36 | 44 | 45 | |
| Carbon (surface; %) | 53 | 45 | 60 | 50 | 34 | 27 | 25 | |
| oxygen/metal ratio | 1.09 | 1.14 | 1.5 | 1.13 | 1.2 | 1.5 | 1.5 | |
| State of forming the film | defective | normal | defective | normal | normal | good | good | |
| Epoxy coating reaction | none | discolored | none | none | none | none | none | |

TABLE 2

| Item | Example 7 | Example 8 | Example 9 | Example 10 | Example 11 | Example 12 | Example 13 | Example 14 |
|---|---|---|---|---|---|---|---|---|
| Disodium hydrogen phosphate (parts by weight) | 5 | 10 | 10 | 10 | 10 | 10 | 10 | |
| Sodium gluconate | 3 | 3 | 0 | 1 | 5 | 3 | 3 | 3 |
| Sodium tripolyphosphate | 1 | 1 | 1 | 1 | 1 | 0 | 0.5 | 3 |
| Sodium dihydrogenphosphate | 1.1 | 2.2 | 4 | 4.1 | 4.2 | 3.9 | 4 | 4.5 |
| Phosphoric acid | | | | | | | | |
| Citric acid | | | | | | | | |
| Tartaric acid | | | | | | | | |
| Thio lactic acid | | | | | | | | |
| Potassium hydroxide | | | | | | | | |
| Water | 92.9 | 88.8 | 85 | 83.9 | 79.8 | 83.1 | 82.5 | 79.5 |
| Air aeration time (hr.) | 10 | 10 | 10 | 10 | 10 | 10 | 10 | 10 |
| pH | 7.0 | 7.0 | 7.1 | 6.9 | 7.1 | 6.9 | 7.0 | 7.0 |
| Oxidation reduction potential (mV) | 283 | 280 | 275 | 270 | 263 | −45 | 220 | 310 |
| Pickling reaction time (min.) | 90 | 70 | | 70 | 70 | | 80 | 60 |
| Surface contaminants | none | none | remaining | none | none | remaining | none | none |
| Chromium (surface; %) | 8 | 8.5 | | 8.5 | 8.5 | | 8 | 8.5 |
| Nickel (surface; %) | 3.5 | 4 | | 4 | 4 | | 3.5 | 4 |
| Iron (surface; %) | 13.5 | 13.5 | | 14 | 13.5 | | 14 | 14 |
| Calcium (surface; %) | 4 | 3.5 | | 3.5 | 3.5 | | 4 | 3.5 |
| Oxygen (surface; %) | 43 | 44 | | 45 | 45 | | 42.5 | 45 |
| Carbon (surface; %) | 28 | 26.5 | | 25 | 25.5 | | 28 | 25 |
| oxygen/metal ratio | 1.48 | 1.5 | | 1.5 | 1.5 | | 1.44 | 1.5 |
| State of forming the film | good | good | | good | good | | good | good |
| Epoxy coating reaction | none | none | | none | none | | none | none |

Figure 4:
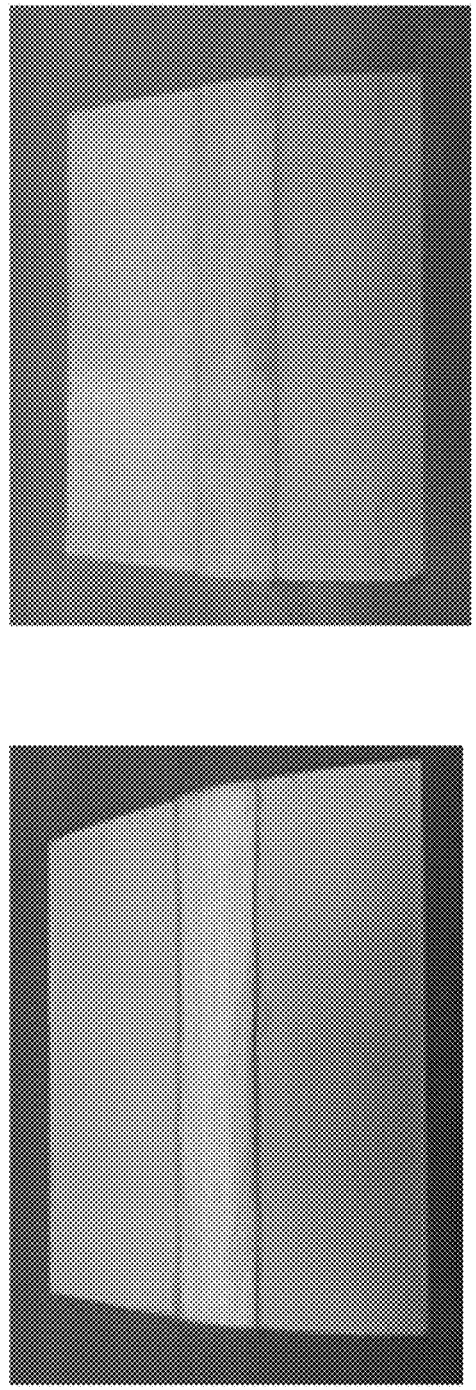
FIG. 4 is a diagram showing a result of a salt water spray test based on JIS H 8502 standard on a surface of stainless steel processed according to Example 1.

As shown in FIG. 4 indicating the salt water spray test results of the JIS H 8502 standard to check out the corrosion resistance against the passive film of the above specimen (stainless steel), it was found that rusts were generated after 80 hours; therefore the passive film is at a defective level.

Comparative Example 1

An acid agent was prepared by mixing 20 parts by weight of phosphoric acid, 5 parts by weight of citric acid, 5 parts by weight of sodium gluconate, and 70 parts by weight of water. As a result of checking the properties, pH was 1.2 and the oxidation reduction potential was 120 mV. Upon applying the acid agent to a portion coated with epoxy, discoloration incurred after 1 hour, and deformation incurred after 1 week.

Therefore, when pickling and passivating the pipe is performed using the acid agent in the field, the efficiency of the work is considerably reduced due to the inconvenience that various measures are required to prevent the acid agent from flowing down to the floor.

These properties are shown in Table 1 and Table 2.

Figure 5:
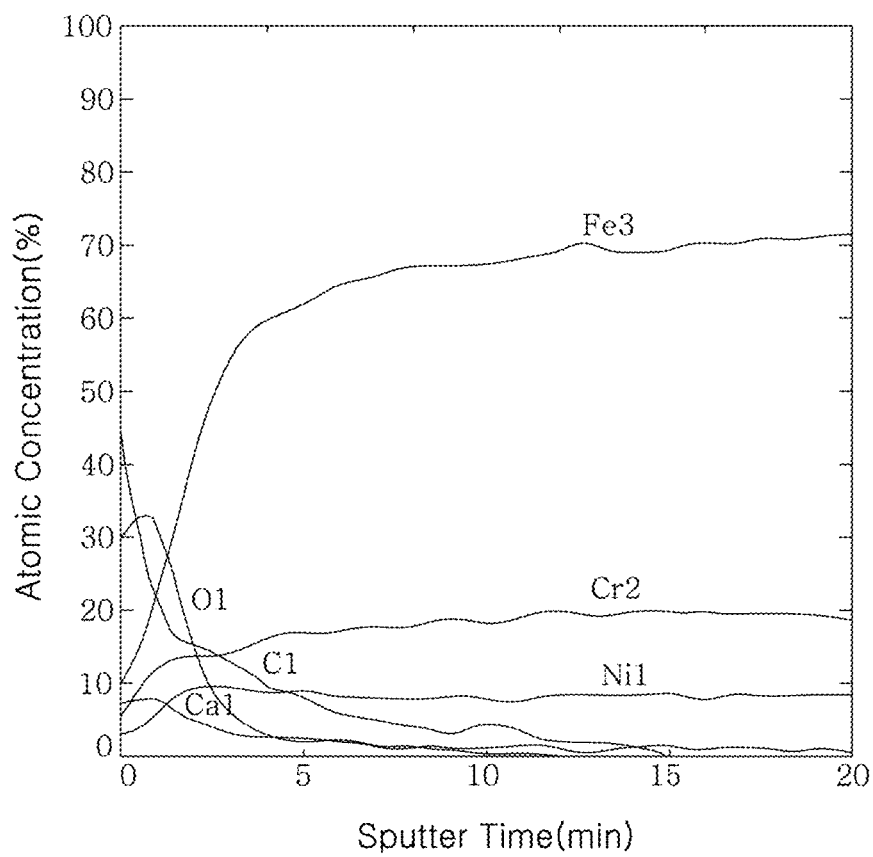
FIG. 5 is a graph showing an analysis for components on a surface of stainless steel processed according to Comparative Example 1.

The result of SAM analysis is shown in FIG. 5, in which the acid agent prepared according to comparative example 1 was applied to the corroded pipe and washed with water after 50 minutes, and the basic agent consisting of 2 parts by weight of sodium hydroxide and 98 parts by weight of water was applied to the pipe and washed with water after 30 minutes, and then a portion of the pipe was sampled.

As shown in FIG. 5, the content of C on the surface was 45%, Cr was 5.5%, Ni was 3%, Fe was 10%, oxygen (O) was 29.5%, and Ca was 7%.

Since the content of C was 45%, the specimen was etched more compared to the corroded specimen (60%). In addition, a total content of the metals was 25.5% and the oxygen content of 29.5%, so the oxygen/metal ratio was 1.14. Thus a passive film was formed on the surface as an oxide containing small amounts of $Cr_2O_3$, $Ni_2O_3$ and $Fe_2O_3$ and the remaining of FeO, CrO and NiO.

The thickness of the passive film having the oxide layer is about 8 nm to about 18 nm.

Figure 6:
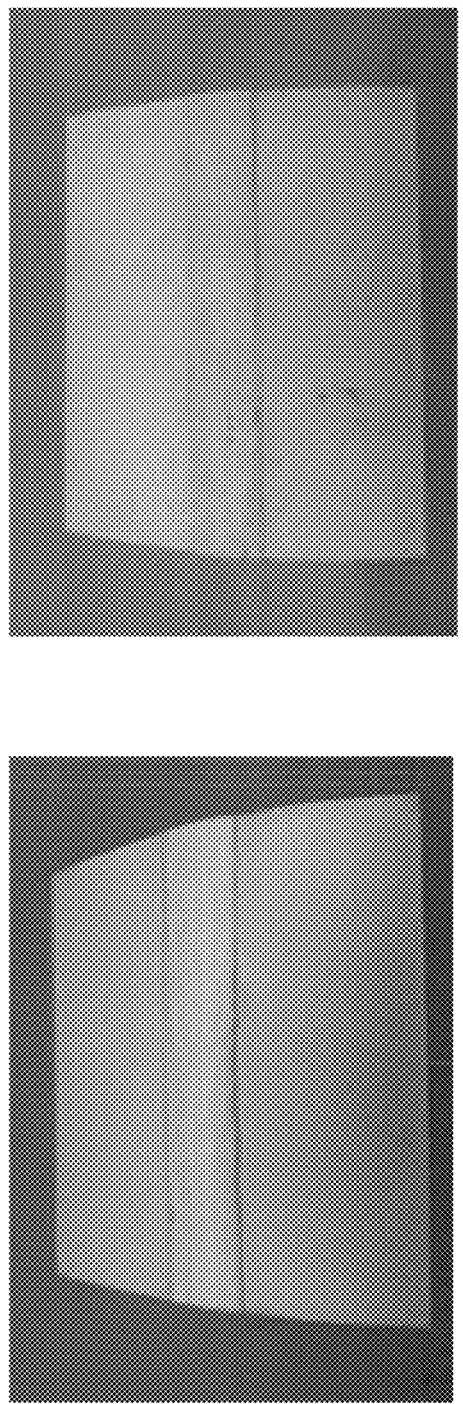
FIG. 6 is a diagram showing a result of a salt water spray test based on JIS H 8502 standard on a surface of stainless steel processed according to Comparative Example 1.

As shown in FIG. 6 indicating the salt water spray test results of the JIS H 8502 standard to probe the corrosion resistance against the passive film of the stainless steel using a specimen, it is found that small amounts of rusts were generated after 200 hours; therefore the passive film is at a normal level.

Comparative Example 2

20 parts by weight of potassium hydroxide were reacted with an acid solution having 5 parts by weight of tartaric acid, 5 parts by weight of tirolactic acid, 10 parts by weight of citric acid, and 60 parts by weight of water to prepare a neutral agent.

As a result of checking the properties of the neutral agent prepared according to the example of the present disclosure, pH was 7.3, the oxidation reduction potential was −190 mV, and deformation did not occur in 1 week after coating the coated portion with the neutral agent.

These properties are shown in Table 1 and Table 2, and it is disadvantageous to use potassium hydroxide which is a hazardous chemical substance as a raw material.

Figure 7:
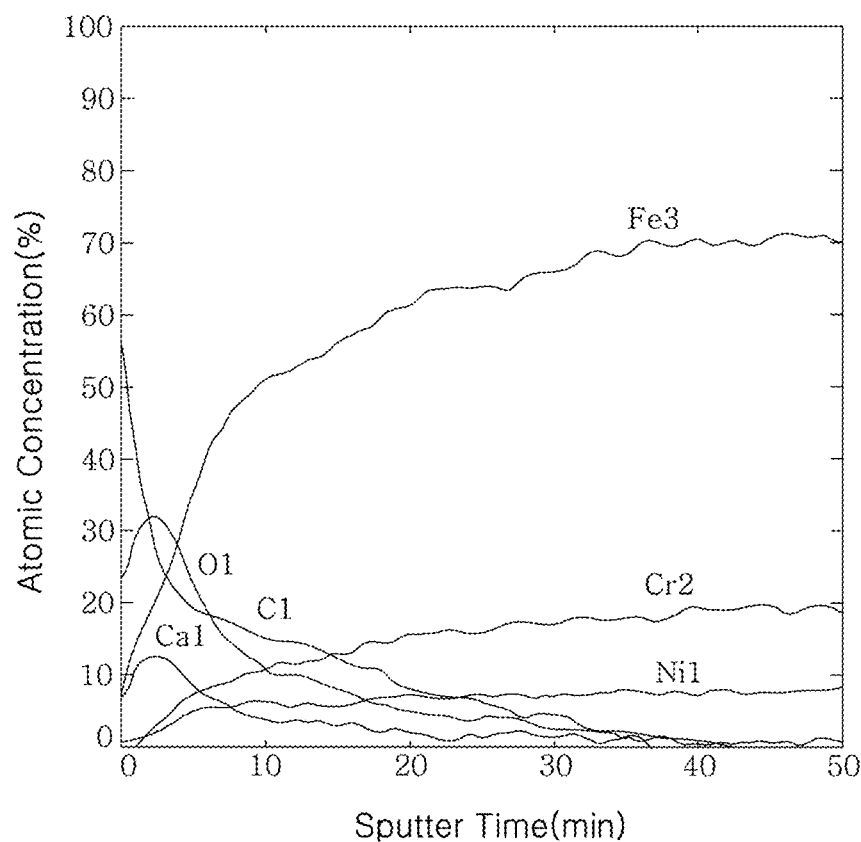
FIG. 7 is a graph showing an analysis for components on a surface of stainless steel processed according to Comparative Example 2.

The result of SAM analysis is shown in FIG. 7, in which the corroded pipe was applied with the neutral agent prepared according to the example and washed with water after 110 minutes, and then a portion of the pipe was sampled.

As shown in FIG. 7, the content of C was 60%, Cr was absent, Ni was 1%, Fe was 8%, Ca was 7%, and oxygen (O) was 24% on the surface.

In other words, since the content of C was 60% on the surface, etching by pickling did not incur, and since Cr exerting a main influence upon the corrosion resistance of the passive film was absent and Ni was also present in a small amount, rusts were easily generated on the surface.

Figure 8:
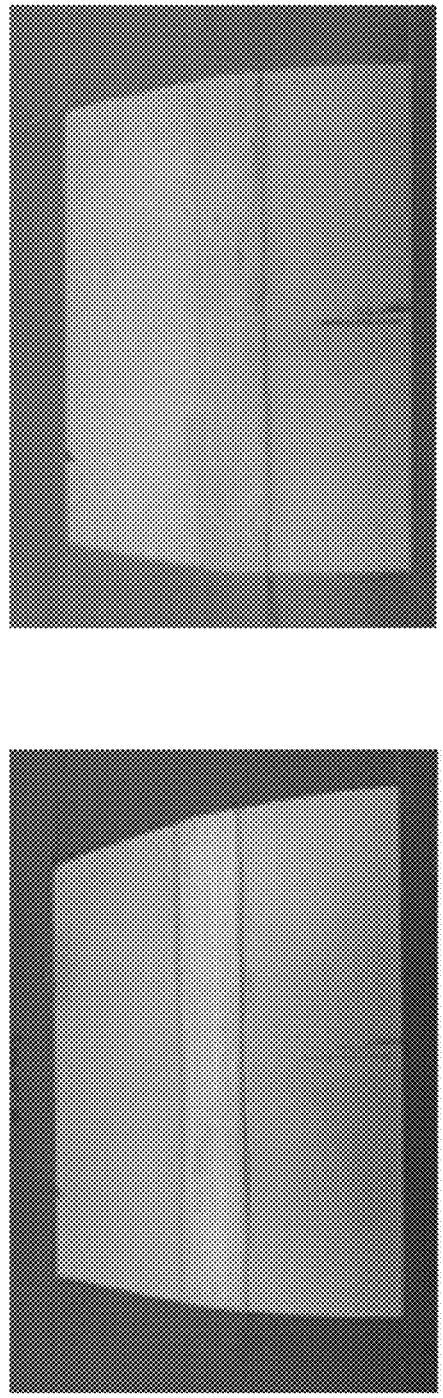
FIG. 8 is a diagram showing a result of a salt water spray test based on JIS H 8502 standard on a surface of stainless steel processed according to Comparative Example 2.

As shown in FIG. 8 indicating the salt water spray test results of the JIS H 8502 standard to probe the corrosion resistance against the passive film of the specimen, it was found that rusts were generated after 50 hours, and therefore the passive film is defective.

Example 2

After the neutral agent was prepared in the same manner as Example 1, 100 g of the neutral agent was aerated with carbon dioxide-free air at a flow rate of 100 ml/min for about 30 minutes, so that the neutral agent having an oxidation reduction potential increased to 6 mV was prepared.

Since the amount of carbon dioxide in the air is 0.03% to 0.05% and carbon dioxide which is more soluble in the neutral agent compared to oxygen causes interference with oxygen dissolution, the neutral agent was aerated with air from which carbon dioxide has been removed.

In order to remove carbon dioxide, the air was passed through a continuous reactor filled with liquid slaked lime.

Before the neutral agent was aerated with the air prepared according to an example of the present disclosure, an automatic intake-type carbon dioxide meter was used to confirm the absence of carbon dioxide in the air, and then the neutral agent was aerated.

The neutral agent prepared according to the example as described above was applied to the portion coated with epoxy, and no discoloration or deformation was observed after one week.

These properties are shown in Table 1 and Table 2.

The neutral agent prepared according to the example was applied to the corroded pipe, the surface was reacted with foreign matter, and about 100 minutes are required when the state that the surface of the pipe is clean after water washing is regarded as a reaction ending time, therefore about 40 minutes were shortened compared to Example 1.

Figure 9:
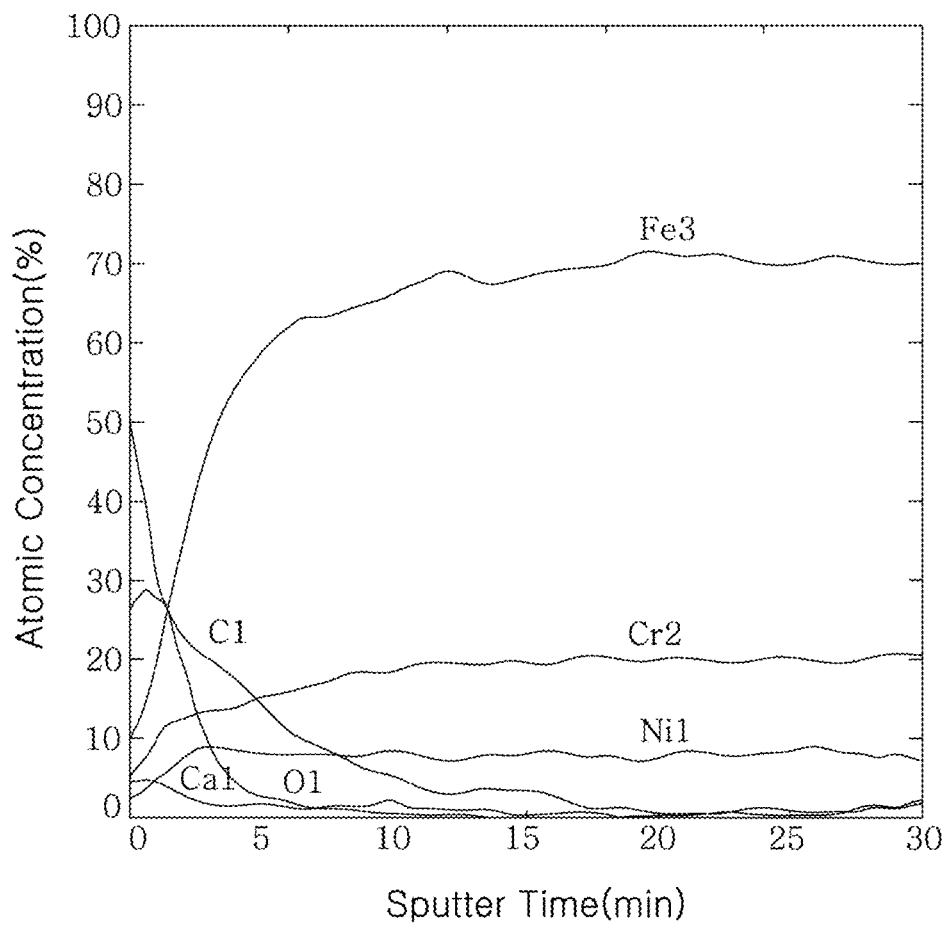
FIG. 9 is a graph showing an analysis for components on a surface of stainless steel processed according to Example 2.

The result of SAM analysis after sampling a portion of the washed pipe is shown in FIG. 9.

As shown in FIG. 9, the content of C on the surface was 50%, Cr was 5.5%, Ni was 3%, Fe was 10%, Ca was 5%, and O was 26.5%.

In other words, since the content of C was 50% on the surface, it was confirmed that the specimen was etched less by pickling. In addition, a total content of the metals was 23.5% and the oxygen content was 26.5%, so the oxygen/metal ratio was 1.13. Thus, a passive film was formed on the surface as an oxide in which about 20% or more of the oxide exists in the form of M2O3 such as $Cr_2O_3$, $Ni_2O_3$ or $Fe_2O_3$, and the remaining of the oxide exists in the form of FeO, CrO, or NiO.

Figure 10:
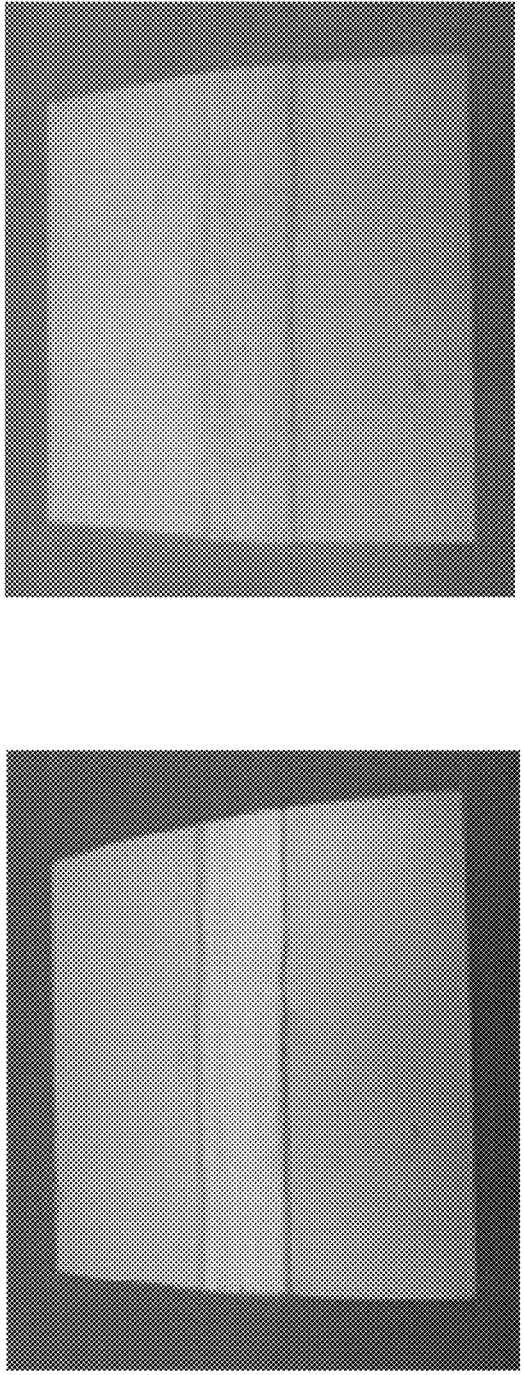
FIG. 10 is a diagram showing a result of a salt water spray test based on JIS H 8502 standard on a surface of stainless steel processed according to Example 2.

As shown in FIG. 10 indicating the salt water spray test results of the JIS H 8502 standard to probe the corrosion resistance against the passive film of the specimen, it was found that small amounts of rusts were generated after 150 hours, and therefore the passive film is at a normal level.

Example 3

After the neutral agent was prepared in the same manner as Example 1, 100 g of the neutral agent was aerated with air from which carbon dioxide was removed at a flow rate of 100 ml/min for about 2 hours, so that the neutral agent having an oxidation reduction potential increased to 90 mV was prepared.

The neutral agent prepared according to the example was applied to the portion coated with epoxy, and no discoloration or deformation was observed after one week.

These properties are shown in Table 1 and Table 2.

The neutral agent prepared according to the example was applied to the corroded pipe, and the surface was reacted with foreign matter, and about 90 minutes were required for the state that the surface of the pipe is clean after water washing, therefore about 50 minutes were shortened compared to Example 1.

Figure 11:
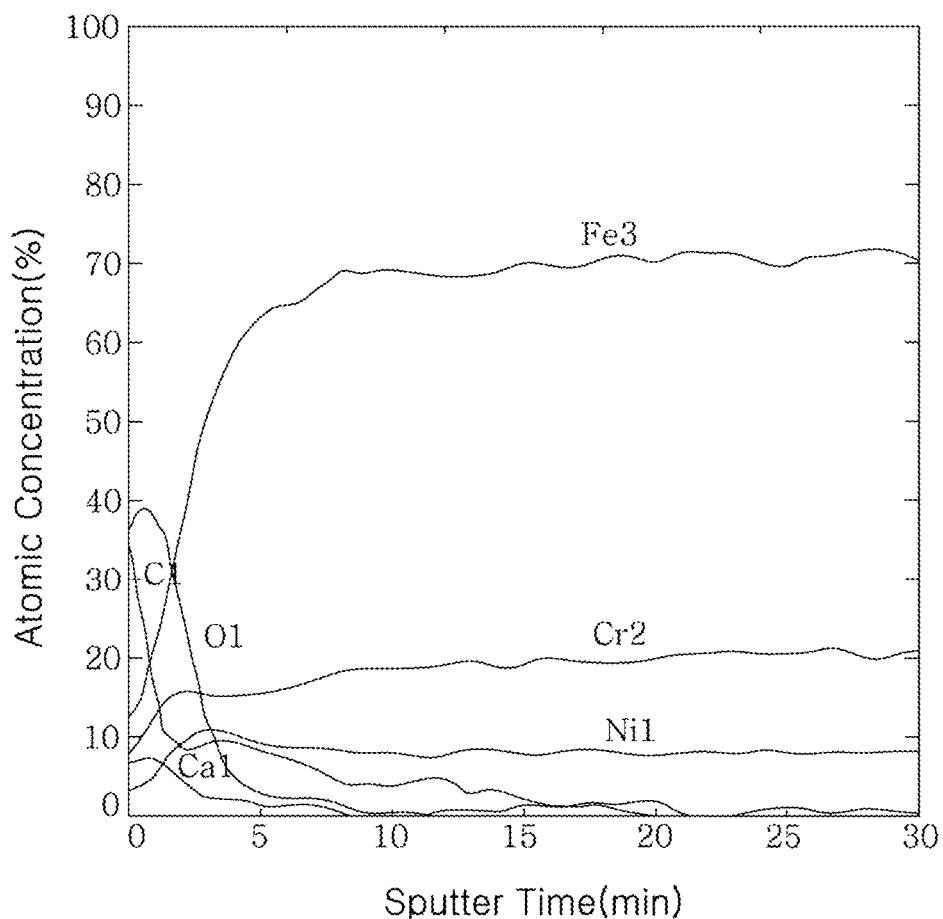
FIG. 11 is a graph showing an analysis for components on a surface of stainless steel processed according to Example 3.

The result of SAM analysis after sampling a portion of the washed pipe is shown in FIG. 11.

As shown in FIG. 11, the content of C on the surface was 34%, Cr was 7.5%, Ni was 3.5%, Fe was 12%, Ca was 7%, and O was 36%.

In other words, since the content of C was 34% on the surface, the specimen was etched more by pickling. In addition, a total content of the metals was 30% and the oxygen content was 36%, so the oxygen/metal ratio was 1.2. Thus, a passive film was formed on the surface as an oxide where about 40% or more thereof were $Cr_2O_3$, $Ni_2O_3$ or $Fe_2O_3$ and FeO, CrO, or NiO partially existed.

Figure 12:
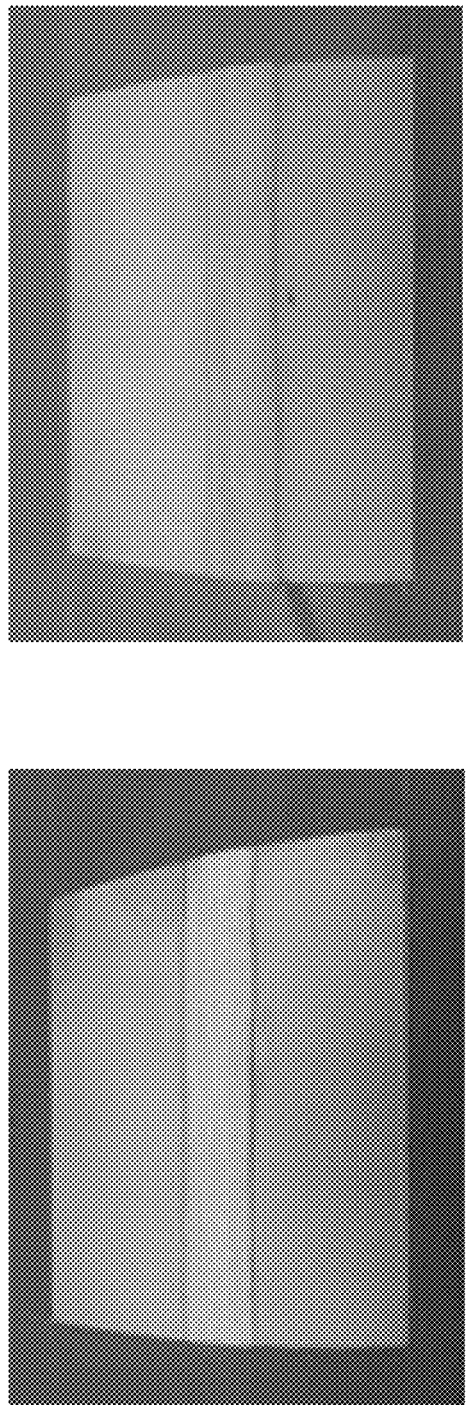
FIG. 12 is a diagram showing a result of a salt water spray test based on JIS H 8502 standard on a surface of stainless steel processed according to Example 3.

As shown in FIG. 12 indicating the salt water spray test results of the JIS H 8502 standard to probe the corrosion resistance against the passive film of the specimen, rusts were generated after 300 hours, therefore the passive film is at a normal level.

Example 4

After the neutral agent was prepared in the same manner as Example 1, 100 g of the neutral agent was aerated with carbon dioxide-free air at a flow rate of 100 ml/min for about 4 hours, so that the neutral agent having an oxidation reduction potential increased to 170 mV was prepared.

The neutral agent prepared according to the example was applied to the portion coated with epoxy, and no discoloration or deformation was observed after one week.

These properties are shown in Table 1 and Table 2.

The neutral agent prepared according to the example was applied to the corroded pipe, the surface was reacted with foreign matter, and about 70 minutes were required for the state that the surface of the pipe is clean after water washing, therefore 70 minutes were shortened compared to Example 1.

Figure 13:
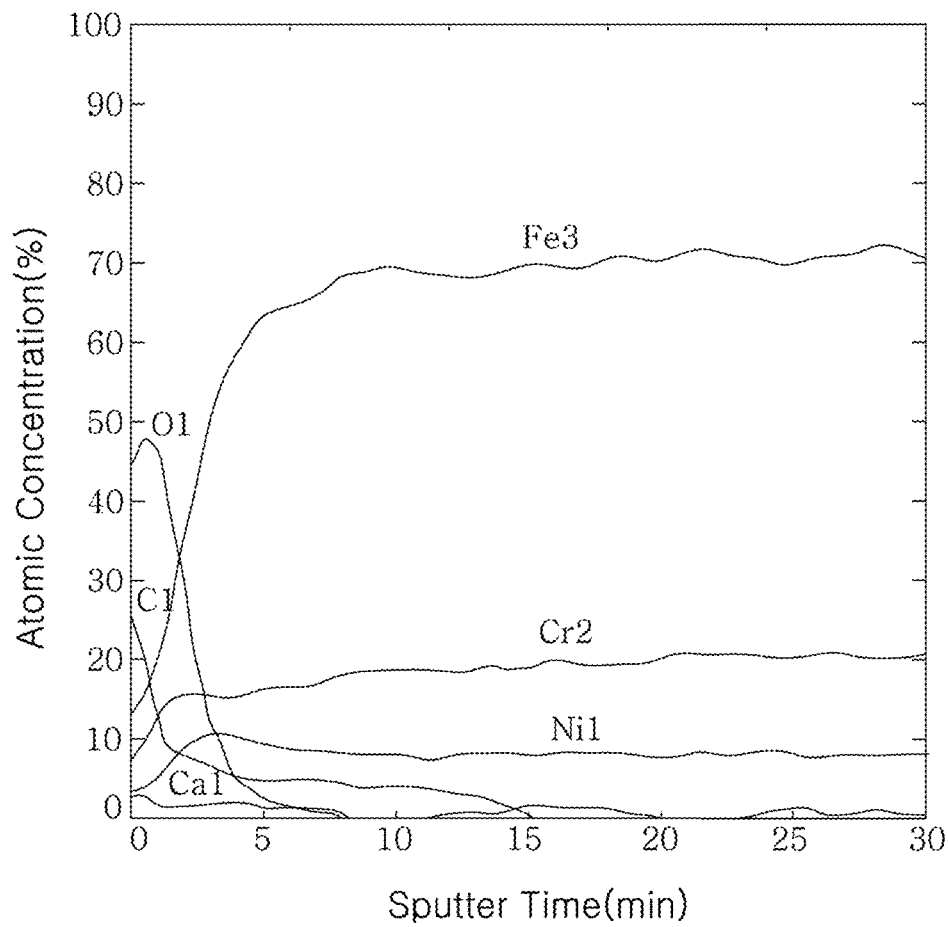
FIG. 13 is a graph showing an analysis for components on a surface of stainless steel processed according to Example 4.

The result of SAM analysis after sampling a portion of the washed pipe is shown in FIG. 13.

As shown in FIG. 13, the content of C on the surface was 27%, Cr was 8%, Ni was 4%, Fe was 13.5%, Ca was 3.5%, and O was 44%.

In other words, since the content of C was 27% on the surface, the specimen was etched more by pickling. In addition, a total content of the metals was 29% and the oxygen content was 44%, so the oxygen/metal ratio was 1.5. Thus, a passive film mostly containing Cr2O3, Ni2O3, or Fe2O3 exists as an oxide was formed on the surface.

Figure 14:
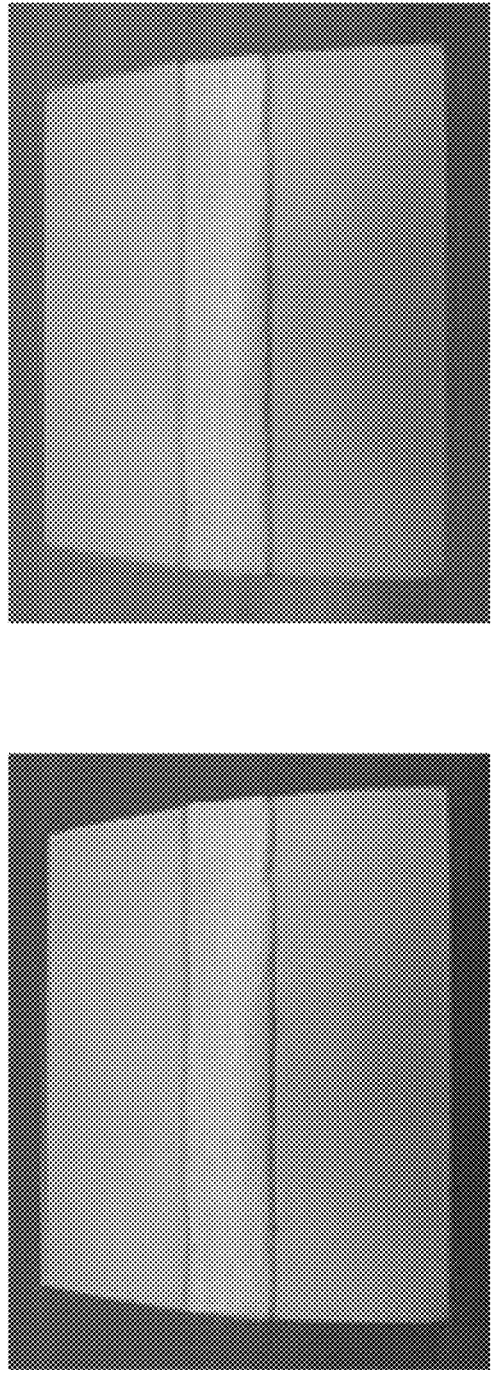
FIG. 14 is a diagram showing a result of a salt water spray test based on JIS H 8502 standard on a surface of stainless steel processed according to Example 4.

As shown in FIG. 14 indicating the salt water spray test results of the JIS H 8502 standard to probe the corrosion resistance against the passive film of the specimen, rusts were not generated after 300 hours, therefore the passive film is good.

Example 5

After the neutral agent was prepared in the same manner as Example 1, 100 g of the neutral agent was aerated with carbon dioxide-free air at a flow rate of 100 ml/min for about 10 hours, so that the neutral agent having an oxidation reduction potential increased to 278 mV was prepared.

The neutral agent prepared according to the example was applied to the portion coated with epoxy, and no discoloration or deformation was observed after one week.

These properties are shown in Table 1 and Table 2.

The neutral agent prepared according to the example was applied to the corroded pipe, and the surface was reacted with foreign matter, and about 70 minutes were required for the state that the surface of the pipe was clean after water washing, As a result of SAM analysis after a portion of the washed pipe was sampled, shapes and components were similar to those of Example 4.

As a result of the salt spray test of the JIS H 8502 standard to probe the corrosion resistance against the passive film, rusts were not generated after 300 hours the same as Example 4, therefore the passive film is good.

Example 6

A basic aqueous solution having 1 part by weight of disodium hydrogen phosphate, 3 parts by weight of sodium gluconate, 1 part by weight of sodium tripolyphosphate, and 94.3 parts by weight of water was reacted with 0.7 parts by weight of monobasic sodium phosphate to prepare a neutral agent having 6.9 pH.

100 g of the neutral agent prepared according to the present example was aerated with carbon dioxide-free air at a flow rate of 100 ml/min for about 10 hours, so that the neutral agent having an oxidation reduction potential increased to 293 mV was prepared.

These properties are shown in Table 1 and Table 2.

The neutral agent prepared according to the example was applied to the corroded pipe, and when the degree of reaction of the foreign matter on the surface was checked, the foreign matter was not removed even after 10 hours.

The above reaction did not occur due to the low phosphate content.

Example 7

A basic aqueous solution having 2 parts by weight of disodium hydrogen phosphate, 3 parts by weight of sodium gluconate, 1 part by weight of sodium tripolyphosphate, and 92.9 parts by weight of water was reacted with 1.1 parts by weight of monobasic sodium phosphate to prepare a neutral agent having 7.0 pH.

100 g of the neutral agent prepared according to the present example was aerated with carbon dioxide-free air at a flow rate of 100 ml/min for about 10 hours, so that the neutral agent having an oxidation reduction potential increased to 283 mV was prepared.

These properties are shown in Table 1 and Table 2.

The neutral agent prepared according to the example was applied to the portion coated with epoxy, and no discoloration or deformation was observed after one week.

The neutral agent prepared according to the example was applied to the corroded pipe, the surface was reacted with foreign matter, and about 90 minutes were required for the state that the surface of the pipe was clean after water washing.

As a result of SAM analysis after a portion of the washed pipe was sampled, shapes and components were similar to those of Example 4.

As a result of the salt spray test of the JIS H 8502 standard to probe the corrosion resistance against the passive film, rusts were not generated after 300 hours the same as Example 4, therefore the passive film is good.

Example 8

A basic aqueous solution having 5 parts by weight of disodium hydrogen phosphate, 3 parts by weight of sodium gluconate, 1 part by weight of sodium tripolyphosphate, and 88.8 parts by weight of water was reacted with 2.2 parts by weight of monobasic sodium phosphate to prepare a neutral agent having 7.0 pH.

100 g of the neutral agent prepared according to the present example was aerated with carbon dioxide-free air at a flow rate of 100 ml/min for about 10 hours, so that the neutral agent having an oxidation reduction potential increased to 280 mV was prepared.

These properties are shown in Table 1 and Table 2.

The neutral agent prepared according to the example was applied to the portion coated with epoxy, and no discoloration or deformation was observed after one week.

The neutral agent prepared according to the example was applied to the corroded pipe, the surface was reacted with foreign matter, and about 70 minutes were required for the state that the surface of the pipe was clean after water washing.

As a result of SAM analysis after a portion of the washed pipe was sampled, shapes and components were similar to those of Example 4.

As a result of the salt spray test of the JIS H 8502 standard to probe the corrosion resistance against the passive film, rusts were not generated after 300 hours the same as Example 4, therefore the passive film is good.

Example 9

A basic aqueous solution having 10 parts by weight of disodium hydrogen phosphate, 1 part by weight of sodium tripolyphosphate, and 85 parts by weight of water was reacted with 4 parts by weight of monobasic sodium phosphate to prepare a neutral agent having 7.1 pH.

100 g of the neutral agent prepared according to the present example was aerated with carbon dioxide-free air at a flow rate of 100 ml/min for about 10 hours, so that the neutral agent having an oxidation reduction potential increased to 275 mV was prepared.

These properties are shown in Table 1 and Table 2.

The neutral agent prepared according to the example was applied to the corroded pipe, and as a result of checking the degree of reaction of the foreign matter on the surface, the foreign matter of oil component was not removed even after 10 hours.

Such a reaction did not occur due to absence of the gluconate component.

Example 10

A basic aqueous solution having 10 parts by weight of disodium hydrogen phosphate, 1 part by weight of sodium gluconate, 1 part by weight of sodium tripolyphosphate, and 83.9 parts by weight of water was reacted with 4.1 parts by weight of monobasic sodium phosphate to prepare a neutral agent having 6.9 pH.

100 g of the neutral agent prepared according to the present example was aerated with carbon dioxide-free air at a flow rate of 100 ml/min for about 10 hours, so that the neutral agent having an oxidation reduction potential increased to 270 mV was prepared.

These properties are shown in Table 1 and Table 2.

The neutral agent prepared according to the example was applied to the portion coated with epoxy and no discoloration or deformation was observed after one week.

The neutral agent prepared according to the example was applied to the corroded pipe, the surface was reacted with foreign matter, and about 70 minutes were required to enable the surface of the pipe to be clean after washing.

When 1 part by weight of the gluconate was present, the foreign matter of the oil component was removed as compared to Example 9.

As a result of SAM analysis after a portion of the washed pipe was sampled, shapes and components were similar to those of Example 4.

As a result of the salt spray test of the JIS H 8502 standard to probe the corrosion resistance against the passive film, rusts were not generated after 300 hours the same as Example 4, therefore the passive film is good.

Example 11

A basic aqueous solution having 10 parts by weight of disodium hydrogen phosphate, 5 parts by weight of sodium gluconate, 1 part by weight of sodium tripolyphosphate, and 79.8 parts by weight of water was reacted with 4.2 parts by weight of monobasic sodium phosphate to prepare a neutral agent having 7.1 pH.

100 g of the neutral agent prepared according to the present example was aerated with carbon dioxide-free air at a flow rate of 100 ml/min for about 10 hours, so that the neutral agent having an oxidation reduction potential increased to 263 mV was prepared.

These properties are shown in Table 1 and Table 2.

The neutral agent prepared according to the example was applied to the portion coated with epoxy, and no discoloration or deformation was observed after one week.

The neutral agent prepared according to the example was applied to the corroded pipe, the surface was reacted with foreign matter, and about 70 minutes were required for the state that the surface of the pipe was clean after water washing.

As a result of SAM analysis after a portion of the washed pipe was sampled, shapes and components were similar to those of Example 4.

As a result of the salt spray test of the JIS H 8502 standard to probe the corrosion resistance against the passive film, rusts were not generated after 300 hours the same as Example 4, therefore the passive film is good.

Example 12

A basic aqueous solution having 10 parts by weight of disodium hydrogen phosphate, 3 parts by weight of sodium gluconate, and 83.1 parts by weight of water was reacted with 3.9 parts by weight of monobasic sodium phosphate to prepare a neutral agent having 6.9 pH.

100 g of the neutral agent prepared according to the present example was aerated with carbon dioxide-free air at a flow rate of 100 ml/min for about 10 hours, so that the neutral agent having an oxidation reduction potential increased to −45 mV was prepared.

These properties are shown in Table 1 and Table 2.

The neutral agent prepared according to the example was applied to the corroded pipe, and as a result of checking the degree of reaction of the foreign matter on the surface, the foreign matter was not removed even after 10 hours.

Such a reaction did not occur due to the absence of sodium tripolyphosphate component which increases the amount of dissolved oxygen and increases permeability and reactivity.

Example 13

A basic aqueous solution having 10 parts by weight of disodium hydrogen phosphate, 3 parts by weight of sodium gluconate, 0.5 part by weight of sodium tripolyphosphate, and 82.5 parts by weight of water was reacted with 4 parts by weight of monobasic sodium phosphate to prepare a neutral agent having 7.0 pH.

100 g of the neutral agent prepared according to the present example was aerated with carbon dioxide-free air at a flow rate of 100 ml/min for about 10 hours, so that the neutral agent having an oxidation reduction potential increased to 220 mV was prepared.

These properties are shown in Table 1 and Table 2.

The neutral agent prepared according to the example was applied to the portion coated with epoxy, and no discoloration or deformation was observed after one week.

The neutral agent prepared according to the example was applied to the corroded pipe, the surface was reacted with foreign matter, and about 80 minutes were required for the state that the surface of the pipe was clean after water washing.

In the above phenomenon, when sodium tripolyphosphate is present in an amount of 0.5 part by weight, permeability and reactivity of the neutral agent increase and the amount of dissolved oxygen increases as compared to Example 12, thereby increasing the oxidation reduction potential.

As a result of SAM analysis after a portion of the washed pipe was sampled, shapes and components were similar to those of Example 4. As a result of the salt spray test of the JIS H 8502 standard to probe the corrosion resistance against the passive film, rusts were not generated after 300 hours the same as Example 4, therefore the passive film is good.

Example 14

A basic aqueous solution having 10 parts by weight of disodium hydrogen phosphate, 3 parts by weight of sodium gluconate, 3 parts by weight of sodium tripolyphosphate, and 79.5 parts by weight of water was reacted with 4.5 parts by weight of monobasic sodium phosphate to prepare a neutral agent having 7.0 pH.

100 g of the neutral agent prepared according to the present example was aerated with carbon dioxide-free air at a flow rate of 100 ml/min for about 10 hours, so that the neutral agent having an oxidation reduction potential increased to 310 mV was prepared.

These properties are shown in Table 1 and Table 2.

The neutral agent prepared according to the example was applied to the portion coated with epoxy, and no discoloration or deformation was observed after one week.

The neutral agent prepared according to the example was applied to the corroded pipe, the surface was reacted with foreign matter, and about 60 minutes were required for the state that the surface of the pipe was clean after water washing.

As a result of SAM analysis after a portion of the washed pipe was sampled, shapes and components were similar to those of Example 4. As a result of the salt spray test of the JIS H 8502 standard to probe the corrosion resistance against the passive film, rusts were not generated after 300 hours the same as Example 4, therefore the passive film is good.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A pickling and passive film treating agent for removing scales and rusts on welding parts of stainless steel pipes and structures, wherein the pickling and passive film treating agent is prepared by:

obtaining a basic aqueous solution by adding 2 to 10 parts by weight of disodium hydrogen phosphate, 1 to 5 parts by weight of sodium gluconate, and 0.5 to 3 parts by weight of sodium tripolyphosphate to water;

neutralizing the basic aqueous solution into a range of 6.9 pH to 7.1 pH by reacting the basic aqueous solution with 1.1 to 4.5 parts by weight of monobasic sodium phosphate; and aerating the neutralized solution with carbon dioxide-free air to increase an amount of dissolved oxygen, so that an oxidation reduction potential in a range of 170 mV to 310 mV is obtained.

2. The pickling and passive film treating agent of claim 1, wherein, upon the carbon dioxide-free aeration, 100 g of a neutralized agent is aerated with the carbon dioxide-free air at a flow rate of 100 ml/min for 2 to 10 hours.

* * * * *